(12) United States Patent
Ozawa et al.

(10) Patent No.: US 7,948,654 B2
(45) Date of Patent: May 24, 2011

(54) IMAGE PROCESSING SYSTEM FOR DISPLAYING OPERATIONAL DISPLAY SCREENS

(75) Inventors: Hidekazu Ozawa, Ebina (JP); Akihiro Enomoto, Ebina (JP); Yukio Tajima, Ebina (JP); Yuji Hikawa, Ebina (JP); Kazuko Kirihara, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 41 days.

(21) Appl. No.: 12/491,572

(22) Filed: Jun. 25, 2009

(65) Prior Publication Data
US 2009/0257090 A1    Oct. 15, 2009

Related U.S. Application Data

(63) Continuation of application No. 10/660,562, filed on Sep. 12, 2003, now abandoned.

(30) Foreign Application Priority Data

Mar. 24, 2003   (JP) ................................ 2003-081355

(51) Int. Cl.
*G06K 1/00* (2006.01)
*G06F 3/12* (2006.01)
*G05B 21/00* (2006.01)
(52) U.S. Cl. ........ 358/1.9; 358/1.15; 358/1.13; 715/273
(58) Field of Classification Search ................... 358/1.9, 358/1.15, 1.16, 1.13; 715/200, 209, 210, 715/273, 700
See application file for complete search history.

(56) References Cited

U.S. PATENT DOCUMENTS

| 5,727,135 | A  | 3/1998  | Webb et al.    |
|-----------|----|---------|----------------|
| 6,924,826 | B1 | 8/2005  | Nakagiri et al.|
| 2002/0030840 | A1 | 3/2002 | Itaki et al.  |
| 2003/0065753 | A1 | 4/2003 | Taninaka et al. |
| 2003/0219272 | A1 | 11/2003 | Mishima et al. |
| 2006/0114509 | A1 | 6/2006 | Itaki et al.   |
| 2006/0132845 | A1 | 6/2006 | Itaki et al.   |

FOREIGN PATENT DOCUMENTS

| JP | 2000-270148 | 9/2000 |
| JP | 2001-273214 | 10/2001 |
| JP | 2001-306594 | 11/2001 |
| JP | 2003-067170 | 3/2003 |

OTHER PUBLICATIONS

Jun. 29, 2007 Office Action issued in copending U.S. Appl. No. 10/660,562, 9 pgs.
Dec. 27, 2007 Office Action issued in copending U.S. Appl. No. 10/660,562, 8 pgs.
Apr. 3, 2009 Office Action issued in copending U.S. Appl. No. 10/660,562, 11 pgs.
Nov. 12, 2009 Office Action issued in copending U.S. Appl. No. 10/660,562, 14 pgs.

*Primary Examiner* — Thomas J Lett
(74) *Attorney, Agent, or Firm* — Oliff & Berridge, PLC

(57) ABSTRACT

The present invention provides a display screen based on a display pattern of an image processing apparatus. Instruction data in which process information representing as a series of processes at least one process performed to document data and UI information for setting execution contents of the processes are described is acquired, and the UI information is extracted. A screen structure is generated on the basis of the UI information, and a screen of screen information obtained by reflecting the setting information on the screen structure is displayed. In this manner, a display screen having versatility and expandability can be provided.

7 Claims, 13 Drawing Sheets

FIG.3

| I/F INFORMATION |
|---|
| SERVICE TYPE |
| SERVICE NAME |
| SERVICE ICON |
| LOCATION INFORMATION |
| INPUT |
| OUTPUT |
| PARAMETER RESTRICTION RULE |
| SERVICE LOCATION |
| METHOD NAME |
| INVOCATION SCHEME |
| IMPLICIT ELEMENT |

FIG.5

| INSTRUCTION DATA |
|---|
| SERVICE TYPE |
| SERVICE NAME |
| SERVICE ICON |
| LOCATION INFORMATION |
| INPUT |
| OUTPUT |
| PARAMETER RESTRICTION RULE |
| SERVICE LOCATION |
| METHOD NAME |
| INVOCATION SCHEME |
| IMPLICIT ELEMENT |
| FLOW<br>(INVOCATION, MAP, METHOD)<br>(CONTROL STRUCTURE, LOGIC OPERATION) |

FIG.6

```
INSTRUCTION DATA OF SCREEN FORMATION

<UI>
 <Popup>
   <Title name="COPY DENSITY">
    <Button>
    <Button name="CLOSE"/>
    <Button type="close"/>
    <Button Layout>
       <x value="700"/>
       <y value="5"/>
    </Button Layout>
    </Button>
    <Button>
      <Button type="alternate" editable="true"/>
      <Button Layout>
         <x value="200"/>
         <y value="100"/>
      </Button Layout>
        <Button No="7"/>
        <Default Selection="3"/>
        <name value="LIGHTER(+3)"/>
        <name value="LIGHTER(+2)"/>
        <name value="LIGHTER(+1)"/>
        <name value="NORMAL"/>
        <name value="DARKER(+1)"/>
        <name value="DARKER(+2)"/>
        <name value="DARKER(+3)"/>
    </Button>
 </Popup>
</UI>
```

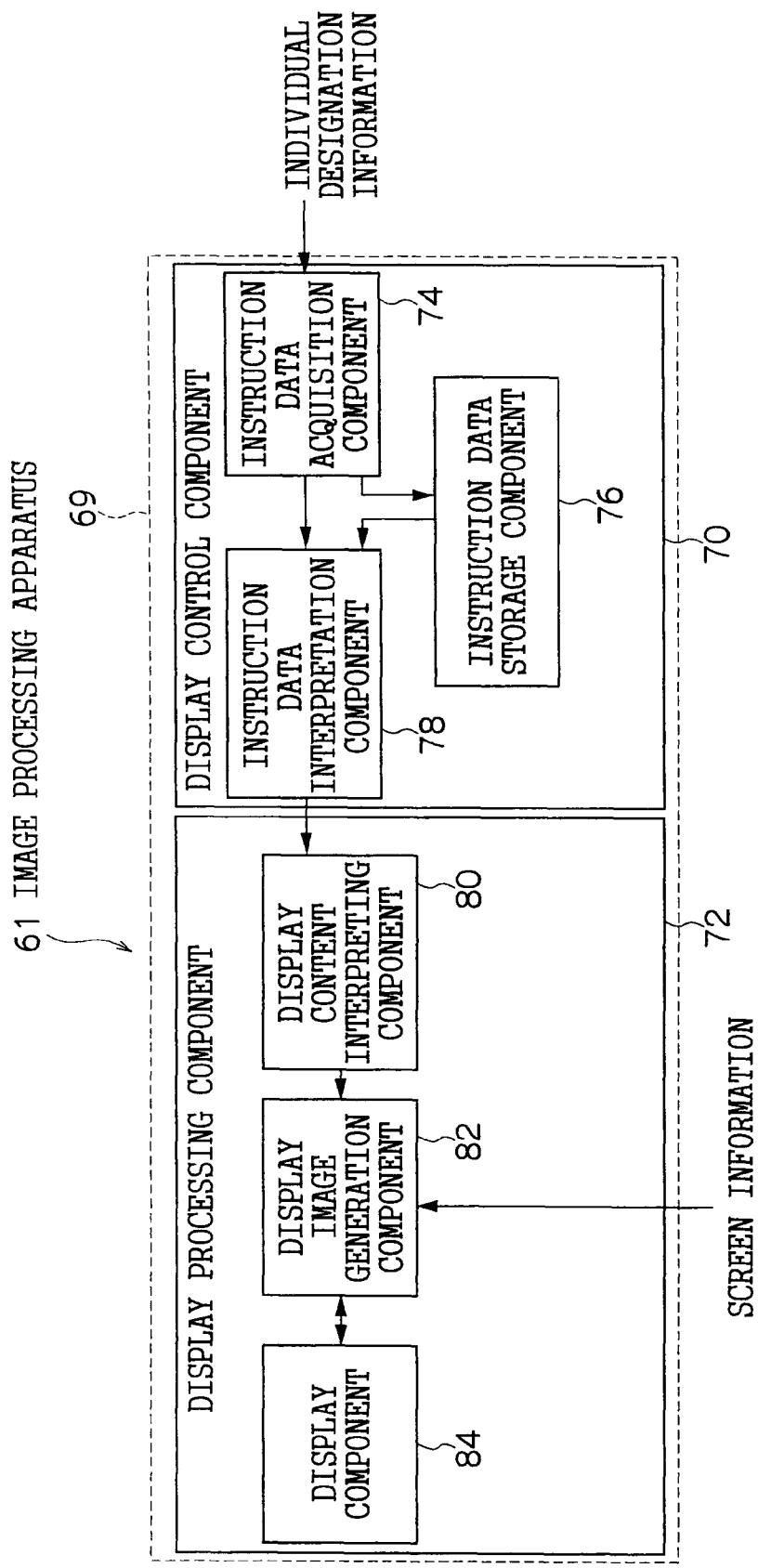

IMAGE PROCESSING SYSTEM FOR DISPLAYING OPERATIONAL DISPLAY SCREENS

CROSS-REFERENCE TO RELATED APPLICATION

This is a Continuation of application Ser. No. 10/660,562 filed Sep. 12, 2003. This application claims priority under 35 USC 119 from Japanese Patent Application No. 2003-81355, the disclosure of which is incorporated by reference herein.

BACKGROUND OF THE INVENTION

1. Field of the Invention

The present invention relates to an image processing apparatus and an image processing method and, more particularly, to an image processing apparatus for performing processes in accordance with instruction data which expresses a plurality of processes to be performed to document data as a series of processes and an image processing method.

2. Description of the Related Art

A conventional complex machine in which a facsimile function, a scanner function, a printer function, and the like are integrated with a copying machine is proposed. Such a complex machine is connected to a network to which a personal computer (PC) or the like is connected, so that a paperwork which uses a copying machine, a facsimile, and the like using paper as main media can be associated with document processes which are converted to electronic form on a PC.

More specifically, a paper document can be scanned to transfer the scanned data to a personal computer, a document received by a facsimile function can be directly transmitted to a PC as image data without being printed, or another process can be performed. In addition, after a paper document or a facsimile-received document converted to electronic form, a large number of procedures and processes are desirably associated with each other and automated.

For this reason, the following technique is proposed. That is, a large number of job templates each constituted as a computerized file in which a desired setting related to an item to be set by a complex machine in advance is described are prepared according to process contents and stored, a job template corresponding to desired contents is designated in the large number of job templates, and the process is executed.

However, in this technique, since there are a large number of job templates, a long time was disadvantageously required to find out and designate a desired job template among the large number of job templates.

As a technique, which can be applied to solve this problem, the following technique is disclosed. That is, desired documents are retrieved from a large number of documents, which are stored in advance, and basic information retrieval is performed depending on an information request of the user to support next-stage retrieval (narrowing down) in the retrieved document group. On the basis of a retrieval result obtained as described above, information of an operable output screen is generated to the user and transferred to the user terminal (for example, see Japanese Patent Application Laid-Open (JP-A) No. 2001-306594 (FIG. 2 pages 10 to 11)).

When this technique is applied to a complex machine and a PC which are connected to the network, the information of the output screen can be transferred to the complex machine and the PC. For this reason, the transferred output screen can be displayed on the apparatus side such as the PC or the complex machine.

However, in the above prior art, on the PC or complex machine side, the transferred output screen can be displayed. However, in the function of this output screen consideration was not given to the size, functions, and the like of a display device arranged on the PC or complex machine side. For this reason, there were occasions when requests had to be made to transfer, information of an output screen depending on a display pattern on the processing apparatus side connected to the network.

SUMMARY OF THE INVENTION

The present invention has been made to solve the above problem, and has as its object to provide an image processing apparatus and an image processing method, which can provide a display screen in accordance with a display pattern of the image processing apparatus.

In order to achieve the above object, the invention includes: an acquisition component for acquiring instruction data in which process information representing as a series of processes a process performed to document data and setting information including at least a setting item and a setting value for setting execution contents of the processes are described; an extraction component for extracting from the instruction data the setting information to be displayed on the display component; a generation component for generating screen information for displaying a screen on the display component on the basis of the setting information extracted by the extraction component; and a display component for displaying a screen on the basis of the screen information.

The image processing apparatus according to the invention includes the acquisition component to acquire instruction data in which process information and setting information are described. The process information expresses as a series of processes a process performed to document data. The setting information includes at least a setting item and a setting value for setting execution contents of processes. The document data is information related to documents. For example, the document data is character information such as text data, image information obtained by reading a paper document, or the like. The process information expresses as a series of processes a process performed to document data, and expresses a co-ordination between processes related to document data. A setting item and a setting value for setting execution contents of processes may be set in advance at predetermined values as initial values, and it is also possible to require the input of a setting value.

The display component displays screen information. The display component can also comprise a touch panel function, which displays screen information and accepts an operation input by the user. The extraction component extracts from the instruction data setting information to be displayed on the display component. The generation component generates a screen structure to be displayed on the display component on the basis of the setting information extracted by the extraction component. The screen structure expresses a position, a display shape, and the like displayed on the display component for the setting item and the setting value. Further, the generation component generates screen information obtained by reflecting the setting information on the screen structure. The display component displays the generated screen information.

In this way, the screen structure to be displayed on the display component is generated on the basis of the setting information described in the instruction data, and the screen information obtained by reflecting the setting information on the screen structure can be displayed on the display component. For this reason, a display screen, which has versatility and expandability, and can be changed in setting information and setting structure, can be provided.

The generation component can include an interpreting component for interpreting a display item for defining the screen structure on the basis of the setting information extracted by the extraction component. The generation component interprets the display item for defining the screen structure on the basis of the extracted setting information and outputs the screen information on which the interpreted display item is reflected. For this reason, on the display component, the screen information is displayed in accordance with the display item, and the display item having expandability can be displayed.

The acquisition component can acquire the instruction data from an external device. Since instruction data which is formed in advance or stored in advance can be acquired from the external device, the instruction data can be subjected by the external device to an updating process, a changing process, or the like, can be acquired as needed, and at least one process related to a series of processes can be executed, and image information displayed.

The instruction data further includes storage location information representing a position of the external device in which the image information is stored in advance, and the acquisition component can further acquire the screen information in accordance with the storage location information. The screen information is stored in advance in the external device, and the acquisition component can acquire screen information in accordance with the storage location information representing the position of the external device. In this manner, screen information can be displayed on the display component without screen information being formed by the image processing apparatus.

As the storage location information, address information representing the position of the external storage device connected to the communication network can be used. The acquisition component can acquire image information through the communication network with reference to the position of the image storage device based on the address information. For this reason, image information can be easily acquired without being generated by the image processing apparatus.

The acquisition component can be connected to a server, in which the screen information is stored and can acquire the screen information from the server. The acquisition component acquires the screen information from the server by connecting the acquisition component to the server. In this manner, the screen information can be acquired without being generated by the image processing apparatus.

According to the following image processing method, a screen having excellent expandability can be provided. More specifically, according to the image processing method the screen can acquire instruction data in which process information representing as a series of processes a process performed to document data and setting information including at least a setting item and a setting value for setting execution contents of the processes are described, and can extract from the instruction data the setting information to be displayed, generate screen information for displaying a screen on the basis of the extracted setting information, and display a screen on the basis of the generated screen information.

A screen having excellent expandability can be provided by causing a computer to process the following image processing program. More specifically, the image processing program executed in a computer which acquires instruction data in which process information representing as a series of processes a process performed to document data and setting information including at least a setting item and a setting value for setting execution contents of the processes are described displays input screen information, extracts from the instruction data the setting information to be displayed, generates a screen structure to be displayed on the basis of the extracted setting information, and outputs screen information obtained by reflecting the setting information on the generated screen structure. A data signal representing the program may be included in a carrier wave, and the carrier wave may be stored in a storage medium.

The image processing apparatus according to the invention and the image processing method according to the invention according to the invention can acquire instruction data in which process information representing as a series of processes a process performed to document data and setting information including at least a setting item and a setting value for setting execution contents of the processes are described, can extract setting information, generate a screen structure on the basis of the setting information, and display a screen of screen information obtained by reflecting the setting information on the screen structure. In this manner, a display screen having versatility and expandability can be provided.

BRIEF DESCRIPTION OF THE DRAWINGS

FIG. 3 is a conceptual diagram showing interface (I/F) information.

FIG. 5 is a conceptual diagram showing instruction data.

FIG. 6 shows an example of UI information described in an XML format.

FIG. 7 is a block diagram showing a display function component of an image processing apparatus.

DETAILED DESCRIPTION OF THE INVENTION

A preferred embodiment of the present invention will be described below in detail with reference to the accompanying drawings.

(System Configuration)

Figure 1:
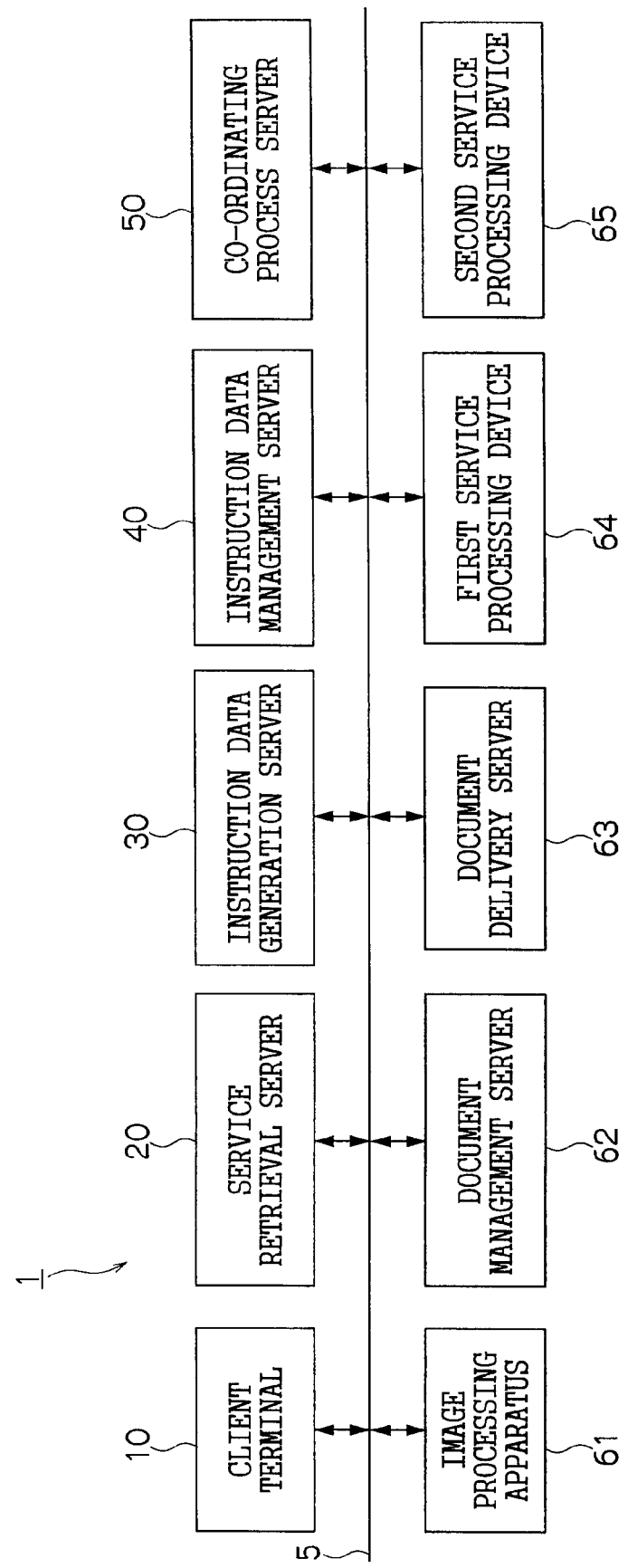
FIG. 1 is a block diagram showing the configuration of a document processing network system according to the first embodiment of the present invention.

FIG. 1 is a block diagram showing the configuration of a document processing system 1 according to this embodiment.

In the document processing system 1, various services and various applications are connected to each other through a network 5. The services mentioned here correspond to functions performed according to external requests and related to documents. The services correspond to, e.g., a copying process, a printing process, a scanning process, a facsimile transmitting/receiving process, an e-mail deliver operation process, a storing in a repository process, a reading from the repository operation, an OCR (Optical Character Recognition) process, a noise reduction process, and the like. However, the invention is not limited to these processes.

The document processing system 1 comprises, in detail, a client terminal 10 having a user interface which incorporates a plurality of services to designate a desired process of the user, a service retrieval server 20 for retrieving a desired service of the user, instruction data generation server 30 for forming instruction data on the basis of information related to service co-ordination designated by the client terminal 10, instruction data management server 40 for managing the instruction data, and a coordinating process server 50 for executing a coordinating process of the respective services according to the instruction data.

Furthermore, the document processing system 1 further comprises an image processing apparatus 61 for performing image processing such as a noise reduction process of an image document, an image rotating process, an OCR process, or an image binding process, a document management server 62 for managing documents, a document delivery server 63 for delivering documents, a first service processing device 64 for performing a first service process, and a second service processing device 65 for performing a second service process.

In this embodiment, the document processing system 1 has a configuration in which a plurality of servers for performing predetermined service processes are connected to each other through the network 5. However, it is satisfactory if the plurality of services are connected to each other through the network 5, and the invention is not limited to the configuration.

The instruction data mentioned here is data including information representing relations between functions and interface (I/F) information for calling functions when a series of processes are disassembled into a plurality of functional processes.

Figure 2:
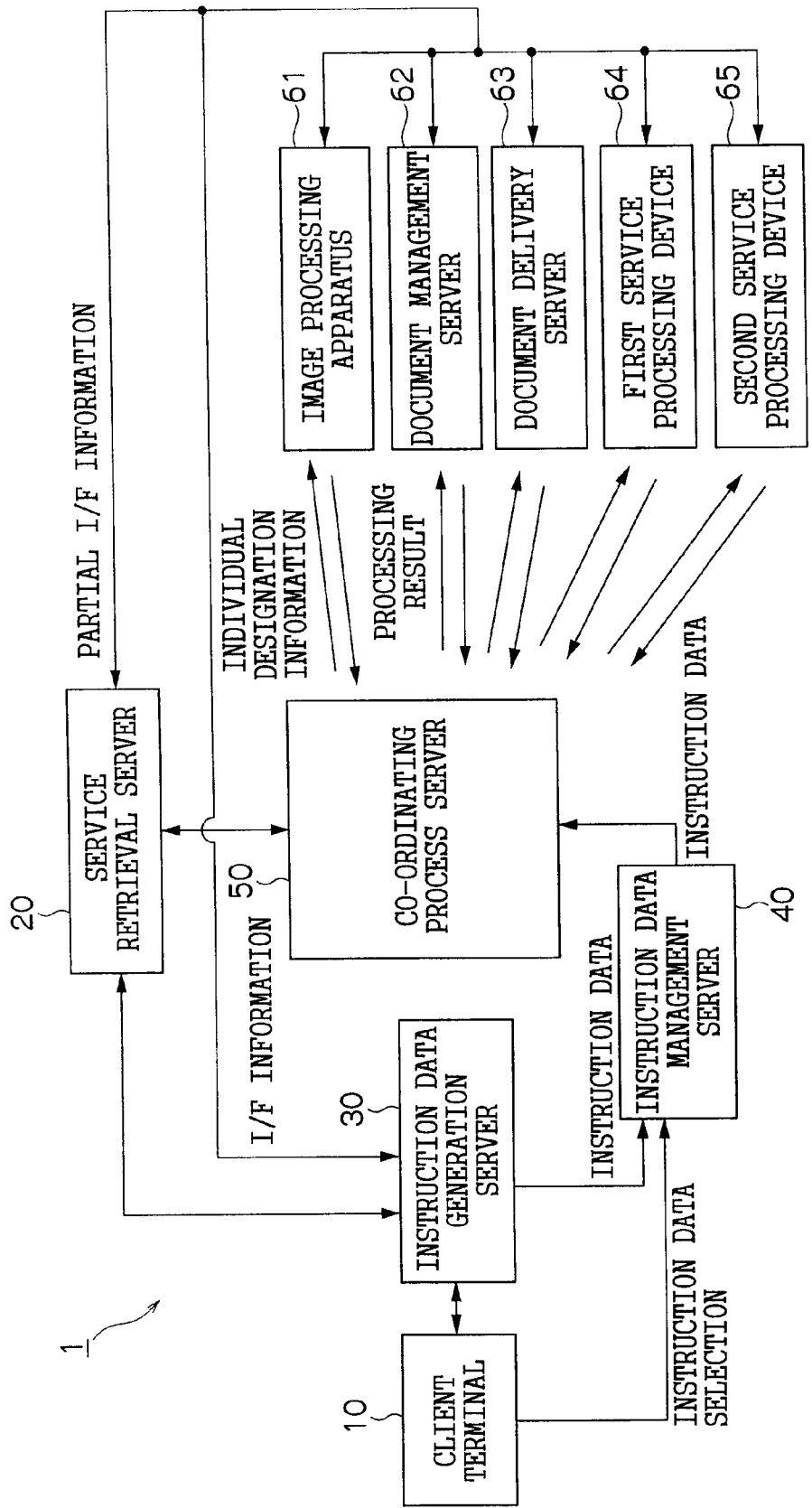
FIG. 2 is a block diagram showing the functional configuration of a complex machine.

FIG. 2 is a block diagram for explaining interrelations between service processing devices such as the image processing apparatus 61, the document management server 62, the document delivery server 63, the first service processing device 64, and the second service processing device 65 which constitute the document processing system 1. The service processing devices store pieces of I/F information representing the contents of services provided by the service processing devices, respectively.

FIG. 3 is a diagram showing the configuration of the I/F information. The I/F information is constituted by <Service Class>, <ServiceName>, <ServiceIcon>, <ServiceInfo.Location>, <Input>, <Output>, <Parameter Restriction Rules>, <Service Location>, <Method Name>, <Invocation Scheme>, and <Implicit Elements>.

<Service Class> is a class of service provided by the service processing device. As <Service Class>, <Service Class> which is defined in advance is used. <Service Class> corresponds to scanning, printing, repository, flow, or the like. <Service Name> is the name of a service provided by the service processing device. <Service Icon> is position information of an icon displayed on a Graphical User Interface (GUI) of the client terminal 10. <Service Info. Location> is a Uniform Resource Locator (URL) used when the instruction data generation server 30 acquires I/F information.

<Input> is an input to a service. <Output> is an output from a service. <Parameter Restriction Rules> is a restriction rule applied to <Input>. <Service Info. Location> is position information used when a service is actually used. In <Method Name>, a name indicating a method of providing a service process or a service is described.

<Invocation Scheme> is a scheme for calling a service process and invoking the service process. Note that, as <Invocation Scheme>, SOAP (Simple Object Access Protocol), SMTP (Simple Mail Transfer Protocol), and the like which are protocols for message exchange can be used. <Implicit Elements> is not data which is explicitly transferred to the subsequent process as output but is data which can be referred to in a subsequent process.

The client terminal 10 comprises the functions of a graphical user interface (GUI) for performing predetermined operations such as an operation of designating formulation of instruction data, or a display operation for selecting instruction data to be invoked.

The service retrieval server 20 retrieves a service corresponding to a retrieve condition from a plurality of services connected to the network 5. The service retrieval server 20 stores in advance a part of I/F information (to be referred to as "partial I/F information" hereinafter) of the various service processing devices such as the image processing apparatus 61, the document management server 62, the document delivery server 63, the first service processing device 64, and the second service processing device 65. The partial I/F information mentioned here corresponds to <Service Class>, <Service Name>, <Service Inf. Location>, <Input> information, and <Output> information.

The service retrieval server 20 retrieves a service by using the partial I/F information of the service processing devices when retrieving conditions are transmitted from the instruction data generation server 30 or the co-ordinating process server 50. For example, when the service retrieval server 20 retrieves the same service as the predetermined service, the service retrieval server 20 may retrieve a service having the same <Service Class> as that of the predetermined service, a service having the same <Input> and <Output> as those of the predetermined service, or a service having all the same pieces of information as those of the predetermined service.

The instruction data generation server 30 acquires pieces of I/F information from the service processing devices and generates instruction data for co-ordinating services provided by the service processing devices. The instruction data generation server 30 executes the following process in detail to form instruction data.

The instruction data generation server 30 requests predetermined service processing devices distributed on the network 5 to transmit pieces of I/F information related to the services on the basis of <Service Info. Location>. When there is no service processing device, the instruction data generation server 30 designates the service retrieval server 20 to retrieve another service processing device for performing the same service as that performed by the predetermined service processing device. The instruction data generation server 30 may acquire <Service Info. Location> of the other service processing device from the service retrieval server 20.

The instruction data generation server 30 manages a retrieval result from the service retrieval server 20 and the pieces of I/F information received from the service processing devices. The instruction data generation server 30 generates an Hyper Markup Language (HTML) file used as a GUI screen for defining a job flow on the basis of the pieces of I/F information acquired from the service processing devices. When the instruction data generation server 30 receives a request from the client terminal 10 to inspect a service, the instruction data generation server 30 transmits the HTML file used as the GUI screen to the client terminal 10.

In the client terminal 10, a job flow is defined by the GUI screen for defining a job flow.

The client terminal 10 transmits job flow information defined by an operation of the user to the instruction data generation server 30.

The instruction data generation server 30 forms instruction data defining information for specifying a document to be processed such as the contents of processes requested to be performed by the services, input parameters, co-ordinating methods of the services (job flow), a document name, and storage location information on the basis of the job flow information related to the designation of service co-ordination by the user and the I/F information of each service. The instruction data is constituted by an XML format file.

FIG. 5 is a conceptual diagram showing the instruction data constituted in the XML format. Since a co-ordinating process of the plurality of services is considered as one service, the instruction data has a configuration in which <Flow> is added to the I/F information shown in FIG. 3.

<Flow> is an element, which describes correlation between services and includes <Invoke>, a control structure or a logic operation, an element such as <if> for deciding a condition, an operation designation of an XML structure for adjusting co-ordination between services, and information for specifying a document to be processed.

<Invoke> represents a specific method of the service processing device and executes calling of a service. Elements of <Invoke> include <Map> representing position information of a parameter and a method name <Method> to be called. <if>, <and>, <eq>, and <gt> representing a control structure, a logic operation, or the like perform conditional branching in a co-ordinating process or perform adjustment parameters transferred between services.

The instruction data describes all pieces of information related to control of the coordinating process of the services in the elements of <Flow>. In this manner, the co-ordinating process itself expressed by the instruction data is also considered as one service. The instruction data is not limited to the configuration shown in FIG. 5, and is satisfactory as long as it can perform co-ordination between services.

The instruction data generation server 30 transmits the above instruction data of the XML format to the instruction data management server 40. Moreover, the instruction data generation server 30 may directly transmit the instruction data to the co-ordinating process server 50 when the user designates a service coordinating process to be performed.

On the other hand, the instruction data management server 40 holds the instruction data transmitted from the instruction data generation server 30 and transmits the instruction data to the co-ordinating process server 50 in response to a request from the client terminal 10.

The co-ordinating process server 50 is a server for executing and interpreting the designated instruction data. When the instruction data is transmitted to the co-ordinating process server 50, the co-ordinating process server 50 interprets the instruction data and sequentially calls service processing devices such as the image processing apparatus 61, the document management server 62, and the document delivery server 63 according to an order and a usage method described in the instruction data, and executes a co-ordinating process. Moreover, the co-ordinating process server 50 stores a state of the co-ordinating process being executed and result information of co-ordinating processes completed and notifies the state or the results of the co-ordinating processes in response to external request.

When the co-ordinating process server 50 interprets the instruction data and requests the service processing devices to perform processes, the coordinating process server 50 generates individual pieces of information capable of specifying process request contents and documents to be processed. The co-ordinating process server 50 may extract relative information between various service processes in the co-ordinating process of the processes performed in the service processing devices and describe the relative information in the instruction data. The coordinating process server 50 may also perform process requests not in the format of the instruction data but in information exchange formats inherent in the service processing devices.

The image processing apparatus 61 is a computer in which a software program for performing an image processing function is installed. The image processing apparatus 61 processes a document on the basis of service process request contents included in the individual designation information from the co-ordinating process server 50 and the information contained in a document to be processed. The image processing apparatus 61 notifies the partial I/F information to the service retrieval server 20 at the time of invocation. Furthermore, the image processing apparatus 61 transmits I/F information representing a usage method of an image processing service by means of a request from the instruction data generation server 30. This I/F information is used at the time of the formulation of instruction data.

The document management server 62 has a document storing function. The document management server 62 executes storage, retrieval, or reading of a document, a change in attribute related to the document, or various processes on the basis of the information included in the request from the co-ordinating process server 50.

The document management server 62 notifies the partial I/F information to the service retrieval server 20 at the time of invocation. In addition, the document management server 62 transmits the I/F information representing a usage method of a document management service by means of a request from the instruction data generation server 30.

The document delivery server 63 comprises a function of storing an acquired document in a designated document management server, a function of performing e-mail or facsimile transmission to a designated destination, a function of performing a print output process to a designated printer. The document delivery server 63 performs a document delivery process on the basis of a document designated by the client terminal 10 and information or a delivery destination of the document depending on the individual designation information from the co-ordinating process server 50. The document delivery server 63 notifies the partial I/F information to the service retrieval server 20 at the time of invocation. In addition, the document delivery server 63 transmits the I/F information representing a usage method of a delivery process service by means of a request from the instruction data generation server 30.

The first service processing device 64 is a device, which performs a predetermined service process related to a document according to an external designation. The first service processing device 64 executes a service process to be executed by the first service processing device 64 itself on the basis of information such as an input parameter included in individual designation information from the co-ordinating process server 50 or information for specifying a document to be processed.

The first service processing device 64 notifies the partial I/F information to the service retrieval server 20 at the time of invocation. In addition, the first service processing device 64 transmits the I/F information representing the usage method of the service process on the basis of a request from the instruction data generation server 30. The second service processing device 65 performs in the same fashion as the first service processing device 64 except with regard to the contents of the service process.

In the document processing system 1 constituted as described above, application programs for executing predetermined services are installed in service processing devices such as the image processing apparatus 61, the document management server 62, and the document delivery server 63 to operate as described below.

Service processing devices such as the image processing apparatus 61, the document management server 62, and the document delivery server 63 notify pieces of partial I/F information including pieces of information representing service outlines and addresses to the service retrieval server 20 in an invoking process.

The service retrieval server 20 stores the pieces of partial I/F information transmitted from service processing devices such as the image processing apparatus 61, the document management server 62, and the document delivery server 63. In this manner, the service retrieval server 20 can execute retrieval by using the partial I/F information when a predetermined service retrieving request is received from, e.g., the instruction data generation server 30 or the coordinating process server 50.

(Formulation of Instruction Data)

Figure 8:
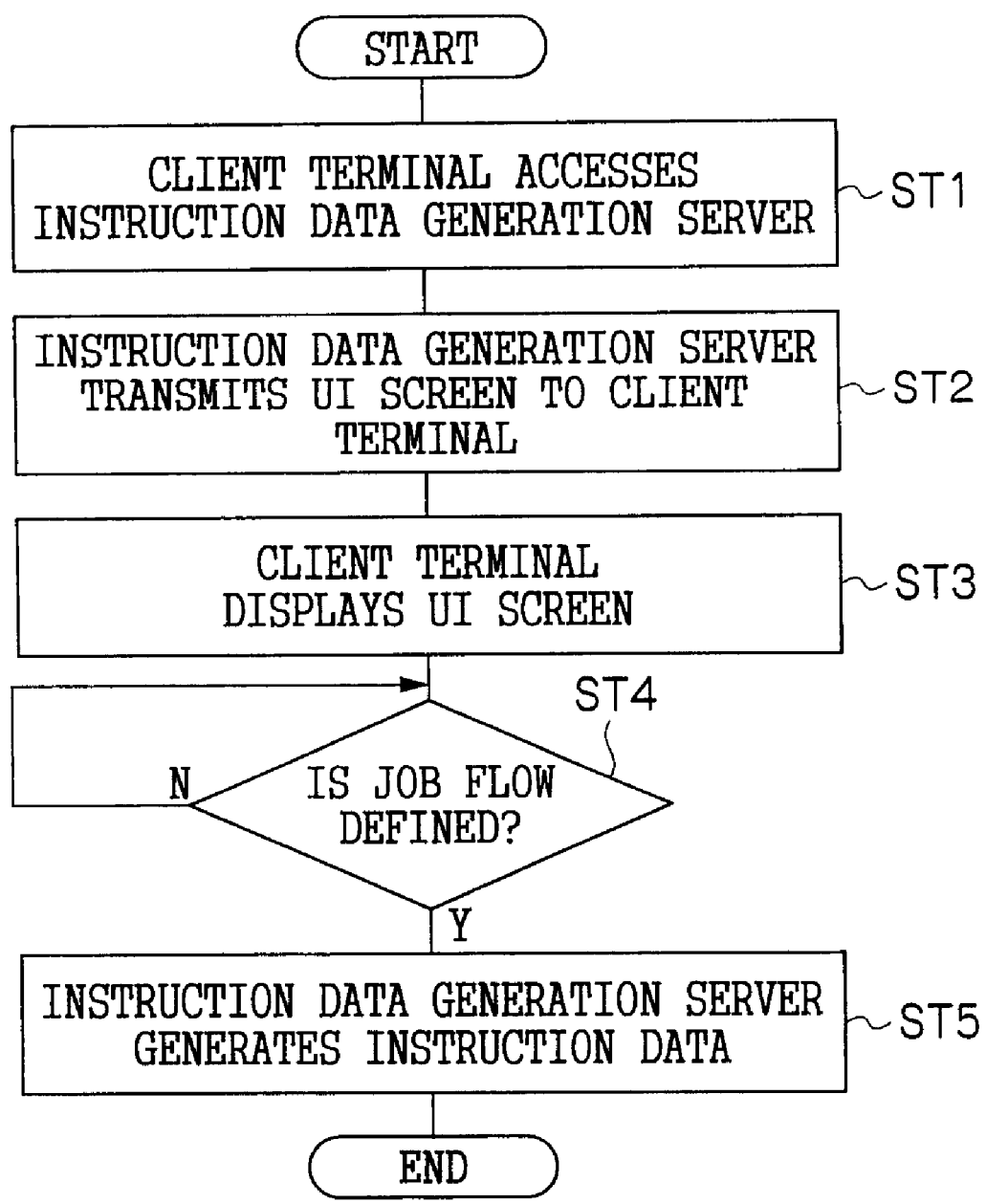
FIG. 8 is a flow chart showing procedures of a client terminal and instruction data generation server in formation of instruction data.

FIG. 8 is a flow chart showing procedures of the client terminal 10 and the instruction data generation server 30 in the formulation of instruction data.

The client terminal 10 accesses the URL (Uniform Resource Locator) of an HTML file generated on the user interface screen provided by the instruction data generation server 30 in accordance with the operation of the user through an installed browser, (step ST1).

The instruction data generation server 30 transmits the HTML file of the user interface screen to the client terminal 10 in response to a browsing request from the client terminal 10 (step ST2).

The client terminal 10 displays the user interface screen on the basis of information which structures a screen included in, e.g., the HTML file transmitted from the instruction data generation server 30 (step ST3). At this time, the user can define a job flow of a desired service co-ordination by using the user interface screen displayed on the client terminal 10.

The client terminal 10 decides whether the job flow is defined through the user interface screen, and waits until the job flow is defined (step ST4). When it is determined that the job flow is defined, the client terminal 10 transmits job flow information related to the service co-ordination defined by the user to the instruction data generation server 30.

The instruction data generation server 30 forms instruction data in which information for specifying a document to be processed such as the contents of processes requested to be performed by the services, a method of co-ordinating the services, a document name, and storage location information are defined on the basis of information related to the job flow of the service co-ordination transmitted from the client terminal 10 (step ST5) and the I/F information acquired from the service processing devices. The instruction data generation server 30 transmits the instruction data of the XML format to the instruction data management server 40.

The instruction data management server 40 stores the instruction data generated by the instruction data generation server 30. The instruction data management server 40 stores a plurality of instruction data formed by the instruction data generation server 30, and reads a selected instruction data when the client terminal 10 designates instruction data to be selected.

(Invocation and Execution of Cooperating Process)

The user can select a desired instruction data from the plurality of instruction data stored in the instruction data management server 40, and can invoke the co-ordinating process. This operation will be described below in detail.

Figure 9:
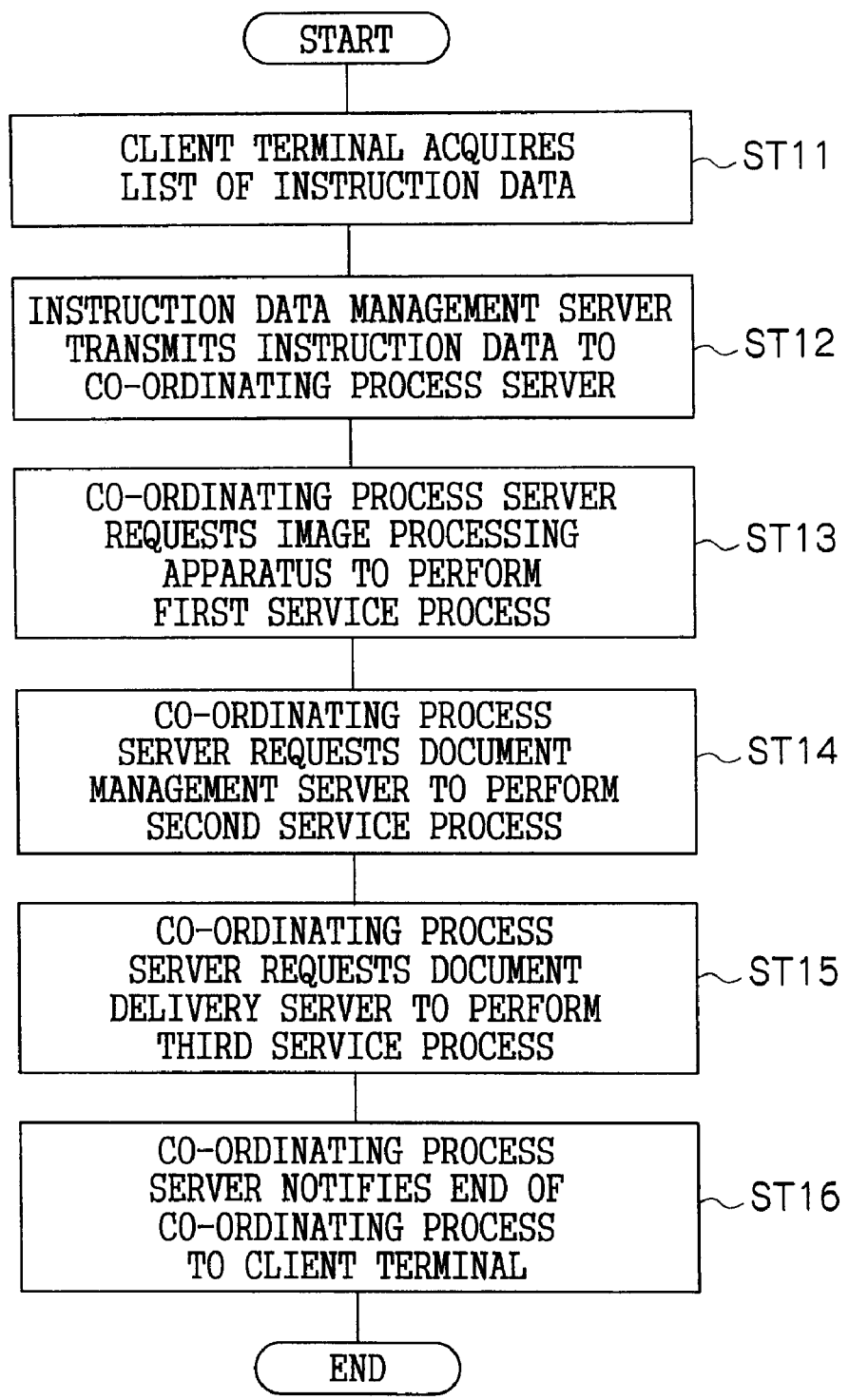
FIG. 9 is a flow chart showing a co-ordinative procedure.

FIG. 9 is a flow chart showing the processes of the client terminal 10, the instruction data management server 40, and the co-ordinating process server 50.

The client terminal 10 accesses the instruction data management server 40 to acquire a list of instruction data managed by the instruction data management server 40 (step ST11).

The client terminal 10 selects instruction data expressing a predetermined service co-ordinating process from a service coordinating process selection screen on the basis of an operation designation of the user and designates the instruction data to be invoked. At this time, if necessary, a parameter input screen is displayed to the user, and an input of a parameter required for execution of the job is received.

The instruction data management server 40 transmits the instruction data designated by the client terminal 10 to the co-ordinating process server 50 (step ST12). As a result, the co-ordinating process server 50 starts execution of the coordinating process.

The co-ordinating process server 50 interprets the instruction data transmitted by the instruction data management server 40 and requests the image processing apparatus 61 which executes the first process described in the instruction data to execute the first service process (step ST13). More specifically, the co-ordinating process server 50 extracts a location of a service processing device requested to perform a process, an input parameter required for a process request, a method name for the process request, an invoking method, and information for specifying a document to be processed on the basis of the information described in the instruction data and formulates individual designation information. The co-ordinating process server 50 transmits the individual designation information to the image processing apparatus 61 which serves as a recipient of a first process request.

The image processing apparatus 61 copies the document to be processed on the basis of the storage location information of the document to be processed described in the individual designation information transmitted and acquires a document. The image processing apparatus 61 interprets the contents of the individual designation information for the acquired document image and performs image processing such as noise reduction or an OCR process to perform a binding process between the document image and an extracted text document. The image processing apparatus 61 stores again in the original storage location the document obtained by the binding at the image document obtained by the image processing with the text document. Upon completion of these processes, the image processing apparatus 61 transmits processing results such as status information of the processes (completion), output parameters, and storage location information of the processed document to the co-ordinating process server 50.

When the coordinating process server 50 receives the processing results from the image processing apparatus 61, the coordinating process server 50 logs and manages a first process request result. The co-ordinating process server 50 specifies a recipient of a second process request on the basis of the instruction data, and requests the document management server 62 to execute the second service process (step ST14).

As with the first service process request, the co-ordinating process server 50 transmits to the document management server 62 individual designation information (information representing that a document serving as information related to a process request be stored, information about a document storage location, and information for specifying a document to be processed).

The document management server 62 performs a storing process of the document which has been processed and stored in the previous process (first service process) on the basis of the request contents of the co-ordinating process server 50 on the basis of storage location information described in the request contents of the co-ordinating process server 50. Upon completion of these processes, the document management server 62 transmits processing results such as status information of the process (completion), output parameters, and storage location information of the processed document to the co-ordinating process server 50.

When the co-ordinating process server 50 receives the processing results from the second service process (document storing process), the co-ordinating process server 50 logs and manages the second process request result. The co-ordinating process server 50 now specifies a recipient of a third process request on the basis of the instruction data, and requests the document delivery server 63 to execute a third service process (step ST15). As with the second service process request, the coordinating process server 50 transmits individual designation information (information representing that a document serving as information related to a process request be stored, information about a document storage location, and information for specifying a document to be processed) to the document delivery server 63.

The document delivery server 63 reads the document which has been processed and stored in the previous process (second service process) on the basis of the request contents of the co-ordinating process server 50, on the basis of information for specifying the document (storage location information), and performs a process described in the request contents. In this case, with the document obtained by binding the text document with the image document, the document delivery server 63 transmits only the text document to an e-mail address designated as a delivery destination for E-mail, and performs facsimile transmission of only the image document to a facsimile number. Upon completion of the process, the document delivery server 63 transmits processing results such as status information of the process (completion), output parameters, and storage location information of the processed document to the coordinating process server 50.

In this process, when, for example, the document delivery server 63 has been unable to access a destination in, e.g., a facsimile transmission process with a predetermined number of second attempts because the destination is engaged the document delivery server 63 transmits, "mail transmission: completion, facsimile transmission: untransmitted" as status information to the coordinating process server 50.

The co-ordinating process server 50 receives the processing results from the third service process, and determines that the next process is not described in the instruction data. In this case, the coordinating process server 50 notifies the client terminal 10 that all the processes have been completed, and terminates the co-ordinating process (step ST16).

In this embodiment, the service retrieval server 20 acquires a part of I/F information (partial I/F information) from the service processing devices. However, the invention is not limited to this configuration. For example, the service retrieval server 20 may acquire all the I/F information.

As described above, according to the document processing system 1 of this embodiment, a series of processes performed by service processing devices such as the image processing apparatus 61, the document management server 62, the document delivery server 63, the first service processing device 64, and the second service processing device 65 are defined by instruction data, so that the series of processes can be executed in one simple operation.

On the other hand, when the image processing apparatus 61 comprises a display component such as a touch panel which displays a screen and accepts an operation input by the user, the user may need to be requested to input a designation of a change in image processing density or the like when image processing such as an OCR process executed by the image processing apparatus 61 on the basis of the individual designation information is received from the coordinating process server 50.

In such a case, a display screen depending on the display component arranged on the image processing apparatus 61 side must be provided.

Therefore, in this embodiment, the individual designation information transmitted from the coordinating process server 50 to the image processing apparatus 61 is transmitted together with user interface (to be referred to a UI hereinafter) information. The UI information is a generic term for information for requesting the user to perform outputting (screen display) or inputting of the pieces of information constituting the I/F information (see FIG. 3) described above. For example, the UI information corresponds to <Input>, <Output>, and <Parameter Restriction Rules> constituting the I/F information.

In this embodiment, the image processing apparatus 61 comprises a display process function component 69 (FIG. 7), by which user can input instructions and display information to the user can be displayed on a display.

FIG. 7 shows an example of a block diagram showing the display process function component 69.

The image processing apparatus 61 includes a microcomputer constituted by a CPU, a ROM, and a RAM, and comprises the display process function component 69. The display process function component 69 is constituted by a display control component 70 and the display processing component 72. The display control component 70 is constituted by instruction data acquisition component 74, instruction data storage component 76, and instruction data interpreting component 78. The display processing component 72 is constituted by a display contents interpreting component 80, a display image generation component 82 and a display component 84 such as an LCD or a CRT. The above-mentioned instruction data acquisition component 74, the instruction data storage component 76, the instruction data interpreting component 78, the display contents interpreting component 80, the display image generation component 82 and the display component 84 are connected to a microcomputer and can exchange data with each other.

The instruction data acquisition component 74 is connected to the network 5 and acquires individual designation information from the coordinating process server 50. The instruction data storage component 76 stores the acquired individual designation information. The instruction data interpreting component 78 interprets the individual designation information acquired by the instruction data acquisition component 74, extracts a UI information part included in the individual designation information, and outputs the UI information part to the display processing component 72.

The display contents interpreting component 80 interprets the UI information output from the instruction data interpreting component 78 and outputs an interpretation result to the display image generation component 82. The display image generation component 82 generates screen information of a display screen displayed on the display component 84. When the interpretation result output from the display contents interpreting component 80 includes a reference location information of the screen information, the display image generation component 82 can also acquire screen information depending on the reference location information from the outside (to be described later) As an example of the reference location information, a Uniform Resource Locator (URL) or the like representing a reference location is known.

This embodiment will describe a case in which image information of the HTML format has been stored in the document management server 62 in advance. As the format of the image information stored in the document management server 62, not only the HTML format but also various formats such as the BINARY format or the XML format can be used.

The display component 84 displays a display screen of screen information, accepts an operation input by the user, and has a touch panel function.

The instruction data acquisition component 74 corresponds to the acquisition component according to the invention, and the display component 84 corresponds to the display component. The instruction data interpreting component 78 corresponds to the extraction component according to the invention, the display image generation component 82 corresponds to the generation component, and the display contents interpreting component 80 corresponds to the interpreting component.

In this embodiment, it is assumed that the UI information is stored in advance in the instruction data generation server 30. It may also be assumed that the UI information can be stored in service processing devices such as the image processing apparatus 61 and the document management server 62. The UI information is not stored exclusively in the instruction data generation server 30.

Figure 4:
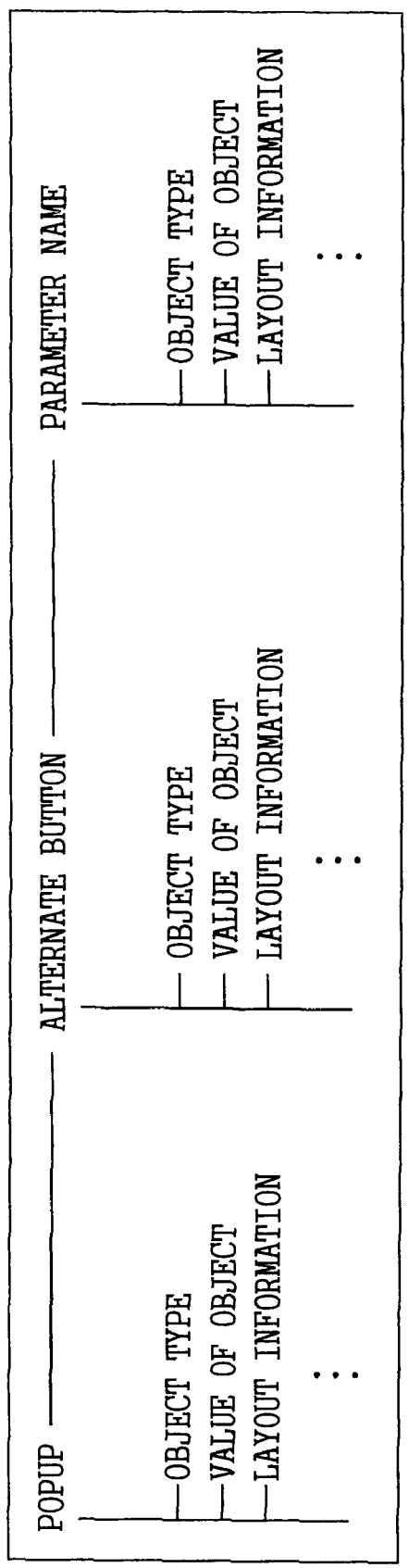
FIG. 4 is an image diagram showing user interface (UI) information.

FIG. 4 is an image diagram showing the configuration of the UI information. The UI information is constituted by pieces of item information representing objects to be displayed. As pieces of item information, for example, <Popup>, <Alternate Button>, <Parameter Name>, and the like are used. Information representing corresponding shapes are stored in association with the pieces of item information such that shapes or characters, which are defined in advance, are formed.

The pieces of item information are structured to include pieces of attribute information. For example, as shown in FIG. 4, the pieces of attribute information are tree-structured as components of pieces of item information. The attribute information is information used for generating a screen structure for displaying the item information on a screen or interpreting a value displayed on the screen, or represents a position, a shape, a value to be displayed, and the like which are used to display on a screen.

As pieces of attribute information, <Object Type>, <Value of Object>, <Layout Information>, and the like are known. <Object Type> represents a process performed such that item information to be displayed on a screen is designated by the user. <Value of Object> is a value such as a string of characters displayed on a screen. <Layout Information> represents relative position coordinates on the display screen of item information displayed on a screen.

The pieces of attribute information belonging to the pieces of item information are not limited to <Object Type>, <Value of Object>, and <Layout Information>, described above. The pieces of attribute information can also be constituted by further pieces of attribute information. For example, the pieces of attribute information can further include pieces of attribute information such as <Number of Objects> representing the number of pieces of item information, <Initial Setting Value> representing an initial setting value, and the like. In contrast to this, it is possible for the attribute information to be constituted by only one of <Object Type>, <Value of Object>, and <Layout Information>.

Although in the present embodiment, the image diagram showing the configuration of the UI information has deliberately been made tree-structured in order to simplify the explanation, it is not limited to the tree-structured diagram.

FIG. 6 shows an example of UI information included in instruction data having an XML format configuration. The UI information included in the instruction data is described between <UI> representing the start position of the UI information and the end position </UI> of the UI information.

In the UI information shown in FIG. 6, as pieces of item information displayed on a screen, <Popup> and <Button> are shown. As the attribute information of <Popup>, "copy density" is shown as the value of an object.

As the attribute information of <Button> shown at an upper level, "CLOSE" is shown as the value of an object, "close" is shown as an object type, and an X-coordinate value "700" and a Y-coordinate value "5" are shown as the layout information.

As the attribute information of <Button> shown at a lower level, "true" representing that attribute information can be selected as an object type is shown, and "alternate" representing a selective input is shown. As the layout information, an X-coordinate value "200" and a Y-coordinate value "100" are shown. As the number of objects, "7" is shown. As the initial setting value, "3" is shown. As values of objects, "lighter (+3)", "lighter (+2)", "lighter (+1)", "normal", "darker (+1)", "darker (+2)", and "darker (+3)" are shown.

The item information and the attribute information described in the UI information may be determined as follows. For example, predetermined values are prepared in advance in the instruction data generation server 30, and the item information and the attribute information are determined on the basis of the predetermined values thus prepared.

(Screen Display Method in Image Processing Apparatus 61)

Figure 10:
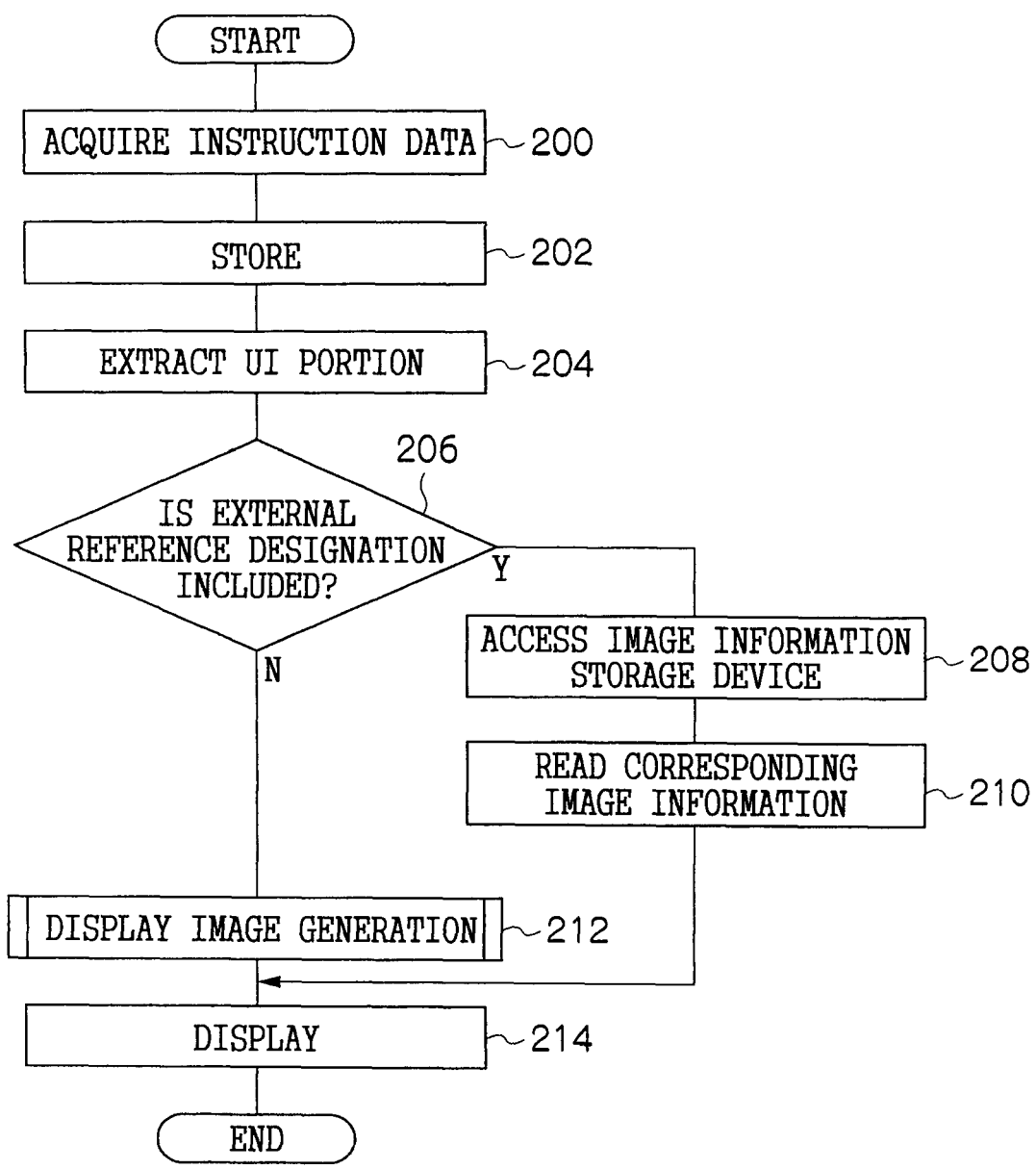
FIG. 10 is a flow chart showing an image display process.

A display process executed in the image processing apparatus 61 in step ST13 (FIG. 9) will be described below with reference to FIG. 10.

In the image processing apparatus 61, in step 200, individual designation information is acquired from the co-ordinating process server 50 by the instruction data acquisition component 74. In the next step 202, the acquired individual designation information is stored in the instruction data storage component 76.

In the next step 204, UI information included in the individual designation information is extracted. The process in step 204 is performed such that the individual designation information is read from the instruction data storage component 76 and information described between <UI> representing the start position of the UI information included in the individual designation information and the end position </UI> of the UI information is read in the instruction data interpreting component 78. The UI information extracted by the process in step 204 is output to the display contents interpreting component 80.

In the next step 206, it is confirmed by the display contents interpreting component 80 whether or not the UI information includes an item representing a designation of external reference.

When the determination is negative in step 206, the procedure proceeds to step 212 and generate screen information of a display screen displayed on the display component 84 by the display image generation component 82 and which is based on the UI information extracted in step 204 (to be described later). Thereafter, the procedure proceeds to step 214.

On the other hand, when the determination is affirmative in step 206, the procedure proceeds to step 208 and reads the screen information based on the external reference information. In this embodiment, for example, when the document management server 62 is designated as the external reference information, the document management server 62 is accessed through the network 5 in accordance with the external reference information. In the next step 210, the corresponding screen information is read from the document management server 62, and the procedure proceeds to step 214.

A request for transmission of the screen information signal is transmitted to the document management server 62 in accordance with the external reference information and the screen information based on the request for transmission signal can be received from the document management server 62.

After the screen information generated in step 212 or read in step 210 is displayed on the display component 84, in step 214 this routine is completed.

(Display Image Generation Process)

Figure 11:
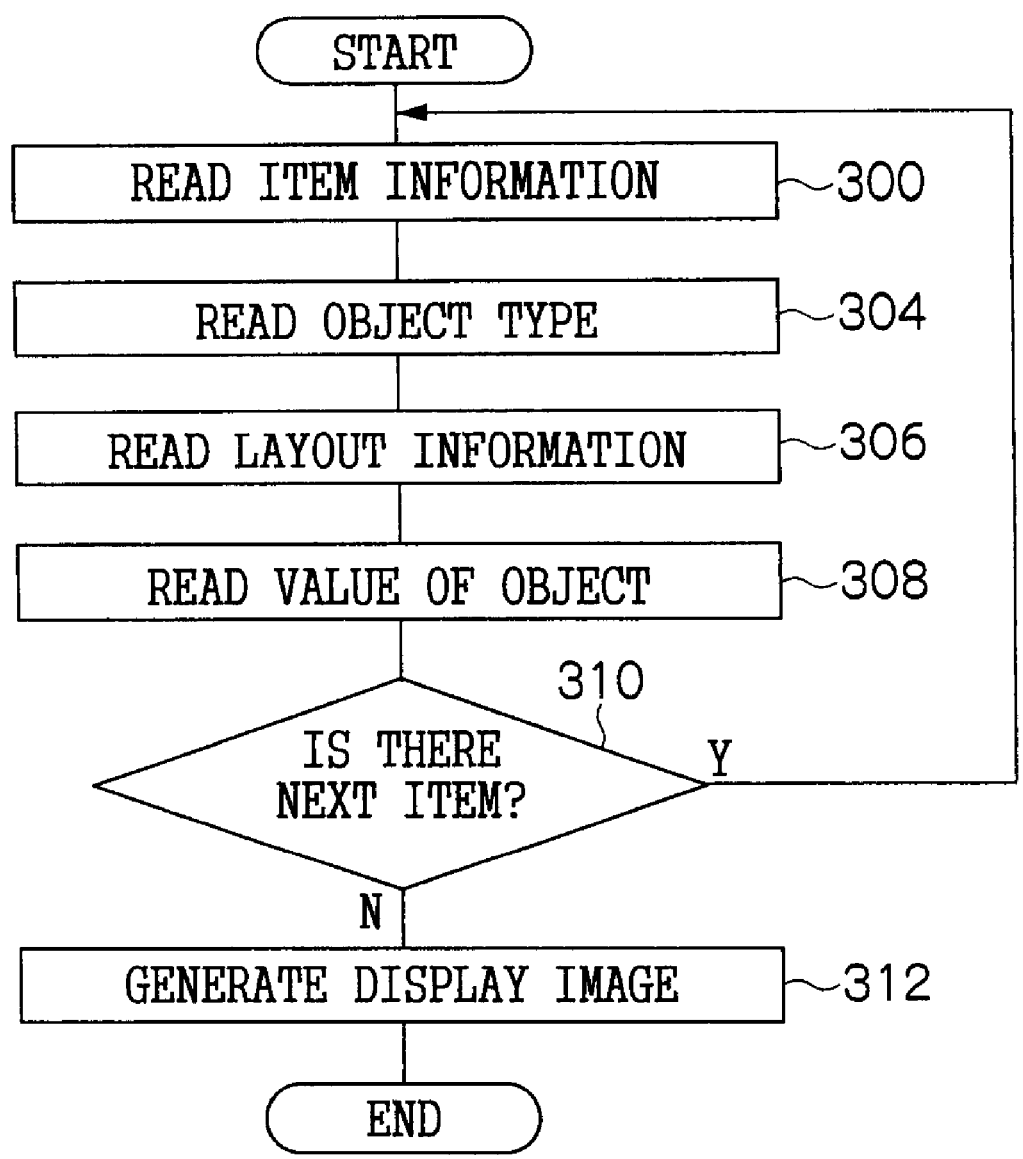
FIG. 11 is a flow chart showing a display image generation process.

A display image generation process in step 212 will be described below with reference to FIG. 11.

In step 300, a reading process of item information included in the UI information is executed. Item information described in the previous stage of the UI information is read by the process in step 300.

In the next step 304, an object type reading process of the item information read in step 300 is executed. By means of the process in step 304, a process performed by items, which are displayed on the screen, from among the item information read in step 300 is read.

In the next step 306, a layout information reading process of the item information read in step 300 is executed. By means of the process in step 306, relative position coordinates from among the item information read in step 300, which are displayed on the screen of the display component 84, are read.

In the next step 308, an object value reading process of the item information read in step 300 is executed. By means of the process in step 308, a value of the item information read in step 300 is displayed on the screen and read.

In the next step 310, it is determined whether or not item information has been further described in the subsequent stage of the item information read in step 300. When the determination is affirmative in step 310, the procedure returns to step 300 and repeats the processes in steps 300 to 308 until the determination becomes negative in step 310.

This embodiment has described cases in which, as the attribute information reading process of the item information read in step 300, object types, layout information, and values of objects are read in the processes in steps 304 to 308. A process of reading additional different pieces of attribute information can also be performed. In this case, upon completion of the process in step 308, it is determined whether or not attribute information for the item information read in step 300 is further included. When the determination is affirmative, the attribute information may be further read.

Furthermore, in the processes in steps 304 to 308, any one of the processes of reading object types, layout information, and values of objects may be executed. In these cases, immediately before execution of processes in step 304 to 308, it is determined whether or not the pieces of attribute information are shown. For example, immediately before the process in step 304, it is determined whether or not an object type belonging to the item information read in step 300 is shown. When the determination is affirmative, the procedure proceeds to step 306. When the determination is negative, it is likewise possible, immediately before the next step 306, to determine whether or not the layout information is shown.

When the processes in steps 300 to 308 are repeated, the pieces of item information shown in the UI information and the pieces of attribute information are sequentially interpreted by the display contents interpreting component 80.

In the next step 312, a screen information generation process is executed. The screen information is generated in the following manner. That is, shapes corresponding to the pieces of item information displayed on the display component 84 are formed in accordance with the pieces of item information read by the processes in steps 300 to 308 and the pieces of attribute information belonging to the pieces of the item information, a screen structure representing the display positions of the pieces of item information of the formed shapes is generated, and values to be displayed are reflected on the generated screen structure.

More specifically, a button and a display pattern which correspond to the item information and which are associated in advance with the item information are formed from the item information, and a screen structure is generated based on the relation of the display position of the item information with the formed display pattern. Moreover, a process to be performed is recognized in accordance with item information selected by the user on the basis of an object type, a value to be displayed is recognized from the value of the object, and the value is reflected in the screen structure generated as described above.

In this embodiment, it is assumed that display specifications such as the size of the display component 84 and the number of displayable colors are stored in advance in the image processing apparatus 61 and that the display specifications are reflected at the time of the generation of the screen information.

The screen information generated in step 312 is displayed on the display component 84 in step 214.

Figure 12:
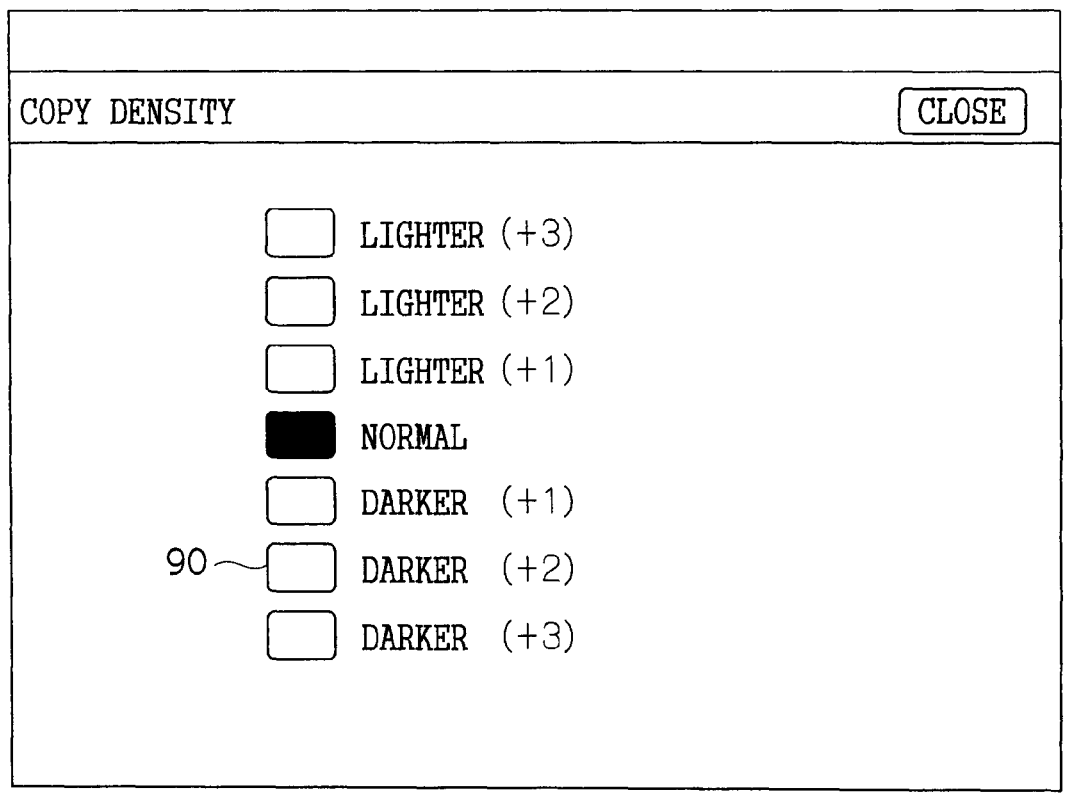
FIG. 12 is an image diagram showing an example of a display screen displayed in accordance with UI information.

For example, when the UI information shown in FIG. 6 is read by the processes in steps 300 to 310, processes of reading the pieces of item information <Popup>, <Button>, and the pieces of attribute information belonging to the pieces of item information are executed, so that a display screen shown in FIG. 12 is displayed. More specifically, as shown in FIG. 12, a "copy density" is displayed on the display screen as a text. A "close" button is displayed at a position indicated by an X-coordinate 700 and a Y-coordinate 5. Further, seven alternate buttons are selectively displayed, and the third alternate button is displayed in the state that it was selected. These alternate buttons are displayed on the screen at a position indicated by an X-coordinate 200 and a Y-coordinate 100. On these alternate buttons, "lighter (+3)", "lighter (+2)", "lighter (+1)", "normal", "darker (+1)", "darker (+2)", and "darker (+3)" are displayed as the values of objects.

When "normal" (displayed in gray in this embodiment) has been selected as an initial value on the display component 84 on which the display screen is shown as in FIG. 12, and is selectively changed to "darker", a designation is input such that an alternate button position 90 displayed at a position at which "darker (+2)" is displayed is depressed by the user, and a value representing "darker (+2) is thereby input. When the input value is registered in individual designation information stored in the instruction data storage component 76 and the value of "Default Selection" representing the initial setting value of attribute information is updated, the subsequent image processing in the image processing apparatus 61 can be executed at a changed density.

This embodiment has described the case in which a screen information generation process of a display screen depending on the UI information is performed by the image processing apparatus 61. However, even in service processing devices such as the document management server 62, the document delivery server 63, the first service processing device 64, and the second service processing device 65 which constitute the document processing system 1, processes can be executed by the same process routine as described above.

In these cases, the same functions as the function of the display process function component 69 are arranged in service processing devices such as the document management server 62, the document delivery server 63, the first service processing device 64, and the second service processing device 65, so that the UI information may be included in the individual designation information transmitted from the co-ordinating process server 50.

In this way, in service processing devices such as the document management server 62, the document delivery server 63, the first service processing device 64, and the second service processing device 65 which constitute the document processing system 1, display screens depending on the UI information can also be displayed in the same manner.

As described above, with regard to each service processing device, a display screen need not be installed in advance, and display screens depending on the functions of the services are dynamically generated on the basis of the instruction data. For this reason, display screens having excellent expandability and versatility can be provided.

Moreover, since image information based on the specifications of the display screens installed in the service processing devices can be formed depending on the UI information, display screens in accordance with the display units of the service processing devices can be provided.

Each of the above embodiments has described a case in which the invention has been applied to the document processing system 1 which executes a series of processes described in instruction data by delegating different processes using the co-ordinating process server 50 and is performed by a plurality of service processing devices connected to each other through a network. However, the invention is not limited to these cases. For example, the invention can also be applied to a document processing system, which executes the processes described in the instruction data without using the co-ordinating process server 50. This feature will be described below with reference to drawings. In the following description, the same reference numerals as in the above embodiments denote the same parts, and a description thereof will be omitted.

Figure 13:
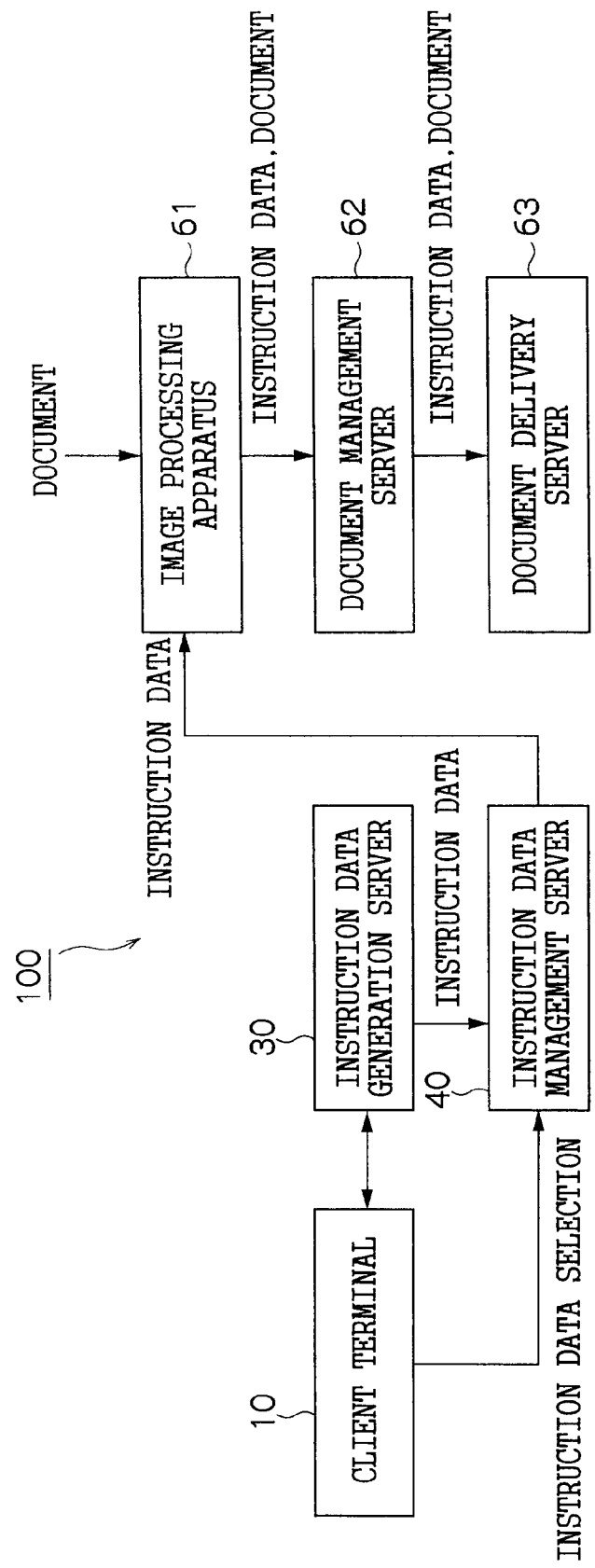
FIG. 13 is a block diagram showing another application example of the invention to explain interrelations between service processing devices constituting a document processing system.

FIG. 13 is a block diagram for explaining interrelation between service processing devices constituting a document processing system 100. The document processing system 100 can execute a co-ordinating process of a plurality of services without using the co-ordinating process server 50 shown in FIGS. 1 and 2.

(Invocation and Execution of Cooperating Process)

The user can select a desired instruction data from a plurality of instruction data stored in the instruction data management server 40, and can invoke a co-ordinating process. This operation will be described below in detail.

The client terminal 10 selects instruction data expressing a desired service coordinating process from a service co-ordinating process selection screen depending on an operation of the user, and designates the instruction data to be invoked. The instruction data management server 40 transmits the instruction data designated by the client terminal 10 to the image processing apparatus 61.

The image processing apparatus 61 acquires a document to be processed on the basis of storage location information of a document to be processed described in the transmitted instruction data. The image processing apparatus 61 interprets service process request contents with respect to the acquired document image, performs image processing such as noise reduction or an OCR process, and performs a process of binding the document image with an extracted text document. The image processing apparatus 61 interprets UI information included in the instruction data and displays on the display component 84 a display image in accordance with the UI information. Upon completion of the predetermined image processing, the image processing apparatus 61 deletes a service process request described in the instruction data. The image processing apparatus 61 transmits a document obtained by binding an image document obtained by image processing with a text document and instruction data containing processing results such as status information of the process (completion), output parameters, and processed document storage location information to the document management server 62 for providing the next service process.

After the predetermined image processing is terminated, the image processing apparatus 61 may correct or delete part of a service request of the image processing apparatus 61 described in the instruction data and can transmit the document to the document management server 62. In addition, the image processing apparatus 61 can be structured to transmit the instruction data to the next service processing device, after the image processing is terminated.

The document management server 62 temporarily stores the document transmitted from the image processing apparatus 61 in the storage location described in the instruction data. The document management server 62 deletes the service process request described in the instruction data, and transmits the document and the instruction data to the document delivery server 63 for performing the next service process.

On the basis of the instruction data, the document delivery server 63 performs e-mail transmission for only a text document of a document obtained by binding a text document with an image document to an e-mail address designated as a delivery destination, and performs facsimile transmission for only the image document to a designated facsimile number. When the document delivery server 63 determines that the next process is not described in the instruction data, the document delivery server 63 notifies the client terminal 10 that all the processes have been completed and terminates the co-ordinating process.

A plurality of service processing devices for executing the services in the document processing system 100 which do not use the co-ordinating process server 50 described above or the document processing system 1 which uses the co-ordinating process server 50 can also be applied to a complex machine which is constituted as an independent machine without a network.

When the invention is applied to the document processing system 100 or the complex machine, the same effects as in the above embodiments can be obtained.

What is claimed is:

1. An image processing apparatus, comprising:
a server that receives process information representing a series of processes, at least one of the processes to be performed to document data, the server generating instruction data based on the received process information, the instruction data having a setting item and a setting value for setting execution contents of the processes; and an image processing device that receives the instruction data generated by the server, the image processing device including:

a display component having display specifications; and a generation component that generates screen information for displaying a screen on the display component based on the setting item and the setting value of the instruction data, wherein the generation component generates the screen information by obtaining a screen structure based on the display specifications of the display component and by applying the setting item and the setting value to the obtained screen structure, wherein the display component displays a screen based on the screen information.

2. The image processing apparatus of claim 1, wherein the generation component includes an interpreting component which interprets a display item for defining the screen structure on the basis of the setting item and the setting value.

3. The image processing apparatus of claim 1, wherein the server acquires the instruction data from an external device.

4. The image processing apparatus of claim 1, wherein the instruction data further includes storage location information representing a position of an external device in which the screen information is stored in advance.

5. The image processing apparatus of claim 4, further comprising a communication network, wherein the storage location information is address information representing the position of the external storage device, which is connected to the communication network.

6. The image processing apparatus of claim 1, wherein
the instruction data further includes a location where the document data is stored,
the document data is obtained from the location, and
image processing is made to the obtained document data.

7. The image processing apparatus of claim 1, wherein
the instruction data further includes contents of a screen structure for displaying,
the screen structure is generated in accordance with the contents, and
the setting information is reflected in a generated screen structure.

* * * * *